United States Patent
Yamazaki

(10) Patent No.: US 9,862,376 B2
(45) Date of Patent: Jan. 9, 2018

(54) HYBRID VEHICLE AND CONTROL METHOD THERFOR

(71) Applicant: HONDA MOTOR CO., LTD., Tokyo (JP)

(72) Inventor: Yuichiro Yamazaki, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 14/758,835

(22) PCT Filed: Jan. 11, 2013

(86) PCT No.: PCT/JP2013/050491
§ 371 (c)(1),
(2) Date: Jul. 1, 2015

(87) PCT Pub. No.: WO2014/109063
PCT Pub. Date: Jul. 17, 2014

(65) Prior Publication Data
US 2015/0336565 A1    Nov. 26, 2015

(51) Int. Cl.
*B60W 20/00* (2016.01)
*B60W 20/20* (2016.01)
(Continued)

(52) U.S. Cl.
CPC ............ *B60W 20/20* (2013.01); *B60K 6/442* (2013.01); *B60W 10/02* (2013.01); *B60W 10/06* (2013.01);
(Continued)

(58) Field of Classification Search
CPC .. B60W 20/10; B60W 20/20; B60W 30/1882; B60K 6/442
See application file for complete search history.

(56) References Cited

U.S. PATENT DOCUMENTS 5,945,808 A * 8/1999 Kikuchi ............... B60K 6/46
320/132
6,209,672 B1 * 4/2001 Severinsky ........... B60K 6/442
180/65.23
(Continued)

FOREIGN PATENT DOCUMENTS

CN    101208229 A    6/2008
CN    102639374 A    8/2012
(Continued)

OTHER PUBLICATIONS

Office Action dated Dec. 15, 2015, issued in counterpart Japanese Application No. 2014-254450. (3 pages).
(Continued)

*Primary Examiner* — Redhwan k Mawari
*Assistant Examiner* — Michael Whalen
(74) *Attorney, Agent, or Firm* — Westerman, Hattori, Daniels & Adrian,

(57) ABSTRACT

A control unit of a hybrid vehicle derives maximum assisting electric power and maximum chargeable electric power of a battery, and permits a shift to an engine direct coupled drive in the event that an imaginary operation point of an internal combustion engine where the maximum assisting electric power is supplied to a motor and an imaginary operation point of the internal combustion engine where the maximum chargeable electric power is stored in the battery, at a rotational speed of the internal combustion engine which corresponds to a required driving force required on the hybrid vehicle when the hybrid vehicle executes the engine direct coupled drive, are positioned inside an area where energy efficiency of the hybrid vehicle becomes higher when the hybrid vehicle executes the engine direct coupled drive than when the hybrid vehicle executes a series drive.

6 Claims, 12 Drawing Sheets

(51) Int. Cl.

| | | |
|---|---|---|
| *B60W 20/10* | (2016.01) | |
| *B60W 10/08* | (2006.01) | |
| *B60W 10/02* | (2006.01) | |
| *B60K 6/442* | (2007.10) | |
| *B60W 10/06* | (2006.01) | |
| *B60W 10/26* | (2006.01) | |
| *B60W 30/188* | (2012.01) | |
| *B60W 20/13* | (2016.01) | |

(52) U.S. Cl.
CPC ............ *B60W 10/08* (2013.01); *B60W 10/26* (2013.01); *B60W 20/00* (2013.01); *B60W 20/10* (2013.01); *B60W 20/13* (2016.01); *B60W 30/1882* (2013.01); *B60W 2510/244* (2013.01); *B60W 2540/10* (2013.01); *B60W 2710/021* (2013.01); *B60W 2710/06* (2013.01); *B60W 2710/08* (2013.01); *Y02T 10/6234* (2013.01); *Y10S 903/93* (2013.01)

(56) References Cited

U.S. PATENT DOCUMENTS

| | | | |
|---|---|---|---|
| 6,625,525 | B2 | 9/2003 | Yoshino et al. |
| 8,068,946 | B2 | 11/2011 | Amamiya |
| 8,571,737 | B2 | 10/2013 | Tamagawa |
| 8,761,986 | B2 | 6/2014 | Tamagawa |
| 8,818,595 | B2 | 8/2014 | Tamagawa |
| 2001/0039230 | A1* | 11/2001 | Severinsky ............ B60H 1/004 477/3 |
| 2002/0062184 | A1 | 5/2002 | Yoshino et al. |
| 2009/0024262 | A1 | 1/2009 | Amamiya |
| 2012/0245783 | A1 | 9/2012 | Tamagawa |
| 2012/0245785 | A1 | 9/2012 | Tamagawa |
| 2012/0253576 | A1 | 10/2012 | Tamagawa |
| 2013/0018540 | A1 | 1/2013 | Yamazaki |
| 2014/0025247 | A1 | 1/2014 | Tamagawa |
| 2014/0249709 | A1 | 9/2014 | Tamagawa |
| 2014/0330467 | A1 | 11/2014 | Tamagawa |
| 2015/0336558 | A1* | 11/2015 | Yamazaki ............ B60K 6/442 701/22 |
| 2015/0353075 | A1* | 12/2015 | Futatsudera ............ B60K 6/442 701/22 |

FOREIGN PATENT DOCUMENTS

| | | |
|---|---|---|
| GB | 2483371 A1 | 3/2012 |
| JP | 9-224304 A | 8/1997 |
| JP | 3052753 B2 | 6/2000 |
| JP | 2002-165307 A | 6/2002 |
| JP | 2004-229411 A | 8/2004 |
| JP | 2004-254402 A | 9/2004 |
| JP | 2007-118715 A | 5/2007 |
| JP | 2008-155820 A | 7/2008 |
| JP | 2009-040094 A | 2/2009 |
| JP | 2012-086645 A | 5/2012 |
| WO | 2011/074482 A1 | 6/2011 |
| WO | 2011/074483 A1 | 6/2011 |
| WO | 2011/078189 A1 | 6/2011 |
| WO | 2011-125865 A1 | 10/2011 |

OTHER PUBLICATIONS

International Search Report dated Feb. 12, 2013, issued in corresponding application No. PCT/JP2013/050491 (1 page).
Search Report dated Dec. 5, 2016, issued in counterpart European Application No. 13870815.1 (10 pages).

* cited by examiner

HYBRID VEHICLE AND CONTROL METHOD THERFOR

TECHNICAL FIELD

The present invention relates to a hybrid vehicle wherein a power transmission engaging/disengaging portion is applied or released to switch a form of drive sources for driving and a control method therefore.

BACKGROUND ART

In a series and parallel combined electric vehicle (SPHV) disclosed in Patent Literature 1, its drive mode is switched to a series hybrid vehicle (SHV) mode or a parallel hybrid vehicle (PHV) mode. In the SHV mode, a generator is driven by a mechanical output of an internal combustion engine, and a motor is driven by electric power generated by the generator and discharged electric power from a battery, whereby wheels are driven by the motor. In the PHV mode, the wheels are driven by the mechanical output of the internal combustion engine. When the vehicle is started, accelerated or slowed through braking, a portion of a required driving force which cannot be achieved by the mechanical output of the internal combustion engine is complemented by the motor.

When the drive mode is shifted from the SHV mode to the PHV mode, the torque of the generator is controlled at a point in time when the vehicle speed (the rotational speed of the motor) reaches a predetermined value V1, so that the rotational speed of the generator gradually comes close to the rotational speed of the motor. Thereafter, the clutch is engaged at a point in time when the rotational speeds of both the generator and the motor coincide with each other and the vehicle speed reaches a predetermined value V2, so that the generator the generator and the motor are coupled together mechanically. In addition, when the rotational speed of the motor becomes lower than the predetermined value in the PHV mode, the generator and the motor are decoupled mechanically by releasing the clutch, whereby the drive mode is switched to the SHV mode.

RELATED ART LITERATURE

Patent Literature

Patent Literature 1: JP-B-3052753
Patent Literature 2: JP-A-H09-224304
Patent Literature 3: International Publication No. 2011/074482
Patent Literature 4: International Publication No. 2011/074483

SUMMARY OF THE INVENTION

Problem that the Invention is to Solve

In the SPHV disclosed in Patent Literature 1 above, the coincidence of the rotational speed of the generator with the rotational speed of the motor is taken as a condition of switching the drive mode from the SHV mode to the PHV mode. However, although these two rotational speeds coincide with each other, it is considered that a shock is produced when the clutch is engaged in such a state that the output of the generator differs from the output of the motor. Namely, in the SPHV of Patent Literature 1, not only does the rotational speed of the generator need to coincide with the rotational speed of the motor, but also signs of angular speeds of the rotational speeds need to coincide with each other and the output of the generator needs to come close to the output of the motor.

FIGS. 11 and 12 are graphs showing an example of a characteristic of an internal combustion engine which drives a generator. In the graphs, an axis of ordinates represents the torque of the internal combustion engine, and an axis of abscissas represents the rotational speed of the internal combustion engine. In FIGS. 11 and 12, a thick solid line represents a line which connects operation points of the internal combustion engine where the least fuel consumption rate is obtained (hereinafter, referred to as a "BSFC bottom line"). In the SHV mode, the internal combustion engine is operated at the operation points on the line. Additionally, in FIGS. 11 and 12, an alternate long and short dash line represents a line which connects operation points of the internal combustion engine where the output remains the same although the torque and rotational speed differ (hereinafter, referred to as an "equioutput line").

In switching the drive mode of the SPHV of Patent Literature 1 to the PHV mode in such a state that the SPHV is in the SHV mode and the internal combustion engine is operated at an operation point A shown in FIG. 11, when the rotational speed of the internal combustion engine is lowered to a value (a desired rotational speed) indicated by a chain double-dashed line in FIG. 11 so that the rotational speed of the generator comes close to the rotational speed of the motor, an attempt to hold the fuel consumption rate shifts the operation point from A to B along the BSFC bottom line. As a result, because the rotational speed of the internal combustion engine is also lowered, the output of the internal combustion engine decreases. As this occurs, the generator cannot supply all the electric power that is required by the motor, resulting in a situation in which the battery has to supply electric power to compensate for the insufficiency.

On the other hand, when the operation point is shifted from A to C along the equioutput line with a view to holding the output of the internal combustion engine under the same conditions, the operation point deviates from the BSFC bottom line, and this deteriorates the fuel consumption rate.

This will also be true when the torque of the internal combustion engine is changed in switching the drive mode from the SHV mode to the PHV mode. As shown in FIG. 12, in switching the drive mode to the PHV mode from the state in which the internal combustion engine is operated at the operation point A, when the torque of the internal combustion engine is lowered to a value (a desired torque) indicated by a chain double-dashed line in FIG. 12, an attempt to hold the fuel consumption rate shifts the operation point from A to D along the BSFC bottom line. As a result, because the rotational speed of the generator which corresponds to the rotational speed of the internal combustion engine does not coincide with the rotational speed of the motor, it is considered that a shock is produced when the clutch is engaged in this state. Additionally, because the rotational speed and torque of the internal combustion engine are lowered, the output of the internal combustion engine decreases. As this occurs, the generator cannot supply all the electric power that is required by the motor, resulting in a situation in which the battery has to supply electric power to compensate for the insufficiency.

On the other hand, when the operation point is shifted from A to E along the equioutput line with a view to holding the output of the internal combustion engine under the same conditions, the operation point deviates from the BSFC bottom line, and this deteriorates the fuel consumption rate.

In addition, when the SPHV of Patent Literature 1 described above is in the PHV mode, the required driving force is obtained from the mechanical output of the internal combustion engine and from an assist output of the motor, depending upon situations. On the other hand, when the SPHV is in the SHV mode, the required driving force is obtained only from the output of the motor. Consequently, even though the clutch is released as a result of a clutch releasing condition being met when switching the drive mode from the PHV mode to the SHV mode, in the event that a change in the output of the motor which is required thereon is large, there may be a situation in which the required driving force cannot be given quickly.

For example, in the event that the state of charge of the battery is low when the drive mode is switched to the SHV mode, it is necessary that the generator is driven by the mechanical output of the internal combustion engine so as to drive the motor by the electric power generated by the generator. However, because the response of the internal combustion engine and the generator is not high, there may be a situation in which electric power corresponding to the required driving force cannot be supplied to the motor immediately after the clutch is released. As this occurs, because the motor cannot output the required driving force, a shock is produced when the clutch is released, resulting in a possibility that the driver feels the sensation of physical disorder. In addition, in order for the battery to compensate for the difference between the electric power required by the motor to meet the required driving force immediately after the clutch is released and the electric power generated by the generator, the battery needs to have a sufficient capacity.

An object of the invention is to provide a hybrid vehicle where a power transmission engaging/disengaging portion is applied or released in consideration of total energy efficiency and a control method therefore Means for Solving the Problem With a view to achieving the object by solving the problem described above, according to claim 1 of the invention, there is provided a hybrid vehicle, including:

an internal combustion engine (for example, an internal combustion engine 111 in an embodiment), a generator (for example, a generator 113 in the embodiment) which is driven by the internal combustion engine to generate electric power, a battery (for example, a battery 101 in the embodiment) which supplies electric power to a motor, the motor (for example, a motor 109 in the embodiment) which is connected to drive wheels (for example, drive wheels 133 in the embodiment) and which is driven by electric power supplied from at least one of the battery and the generator, and a power transmission engaging/disengaging portion (for example, a clutch 117 in the embodiment) which is disposed between the generator and the drive wheels so as to engage or disengage a power transmission path from the internal combustion engine to the drive wheels via the generator, wherein the hybrid vehicle is driven by power from at least one of the motor and the internal combustion engine, and the hybrid vehicle has a control unit (for example, a management ECU 123 in the embodiment) for determining whether the hybrid vehicle executes a series drive in which the motor which is driven by electric power generated by the generator based on power of the internal combustion engine is used as a drive source with the power transmission engaging/disengaging portion released, or executes an engine direct coupled drive in which at least the internal combustion engine is used as a drive source with the power transmission engaging/disengaging portion applied, the control unit includes:

a required driving force calculating section (for example, a required driving force deriving section 201 in the embodiment) for calculating a driving force required on the hybrid vehicle based on an accelerator pedal opening which corresponds to an accelerator pedal operation in the hybrid vehicle and a driving speed of the hybrid vehicle, a maximum assisting electric power deriving section (for example, a maximum assisting electric power deriving section 203 in the embodiment) for deriving maximum assisting electric power which is a largest output that the battery enables to output, based on a state of the battery, a maximum chargeable electric power deriving section (for example, a maximum chargeable electric power deriving section 205 in the embodiment) for deriving maximum chargeable electric power of the battery based on a state of the battery, and an engine direct coupled drive shifting determination section (for example, an engine direct coupled drive shifting determination section 207 in the embodiment) for permitting a shift from the series drive to the engine direct coupled drive in an event that an imaginary operation point of the internal combustion engine in a case that the maximum assisting electric power is supplied to the motor and an imaginary operation point of the internal combustion engine in a case that the maximum chargeable electric power is charged in the battery, at a rotational speed of the internal combustion engine which corresponds to a required driving force calculated by the required driving force calculating section when the hybrid vehicle executes the engine direct coupled drive, are positioned inside an engine direct coupling efficiency enhancing area which is an area of operation points of the internal combustion engine where energy efficiency of the hybrid vehicle becomes higher when the hybrid vehicle executes the engine direct coupled drive than when the hybrid vehicle executes the series drive.

Further, according to claim 2 of the invention, there is provided the hybrid vehicle, wherein the engine direct coupled drive shifting determination section determines to cancel the engine direct coupled drive in an event that an imaginary operation point of the internal combustion engine in a case that the maximum assisting electric power is supplied to the battery or an imaginary operation point of the internal combustion engine in a case that the maximum chargeable electric power is charged to the battery, at a rotational speed of the internal combustion engine of the hybrid vehicle which is executing the engine direct coupled drive, is positioned outside the engine direct coupling efficiency enhancing area.

Further, according to claim 3 of the invention, there is provided the hybrid vehicle, wherein the engine direct coupled drive shifting determination section prohibits a shift from the series drive to the engine direct coupled drive in an event that electric power required for the hybrid vehicle to shift to the engine direct coupled drive is outside a range of chargeable or dischargeable electric power of the battery.

Further, according to claim 4 of the invention, there is provided a control method of a hybrid vehicle including:

an internal combustion engine (for example, an internal combustion engine 111 in an embodiment), a generator (for example, a generator 113 in the embodiment) which is driven by the internal combustion engine to generate electric power, a battery (for example, a battery 101 in the embodiment) which supplies electric power to a motor, the motor (for example, a motor 109 in the embodiment) which is connected to drive wheels (for example, drive wheels 133 in the embodiment) and which is driven by electric power supplied from at least one of the battery and the generator, and a power transmission engaging/disengaging portion (for example, a clutch 117 in the embodiment) which is disposed between the generator and the drive wheels so as to engage or disengage a power transmission path from the internal combustion engine to the drive wheels via the generator, wherein the hybrid vehicle is driven by power from at least one of the motor and the internal combustion engine, and the hybrid vehicle has a control unit (for example, a management ECU 123 in the embodiment) for determining whether the hybrid vehicle executes a series drive in which the motor which is driven by electric power generated by the generator based on power of the internal combustion engine is used as a drive source with the power transmission engaging/disengaging portion released, or executes an engine direct coupled drive in which at least the internal combustion engine is used as a drive source with the power transmission engaging/disengaging portion applied, the control unit includes the steps of:

calculating a driving force required on the hybrid vehicle based on an accelerator pedal opening which corresponds to an accelerator pedal operation in the hybrid vehicle and a driving speed of the hybrid vehicle, deriving maximum assisting electric power which is a largest output that the battery enables to output, based on a state of the battery, deriving maximum chargeable electric power of the battery based on a state of the battery, and permitting a shift from the series drive to the engine direct coupled drive in an event that an imaginary operation point of the internal combustion engine in a case that the maximum assisting electric power is supplied to the motor and an imaginary operation point of the internal combustion engine in a case that the maximum chargeable electric power is charged in the battery, at a rotational speed of the internal combustion engine which corresponds to a required driving force calculated by the required driving force calculating section when the hybrid vehicle executes the engine direct coupled drive, are positioned inside an engine direct coupling efficiency enhancing area which is an area of operation points of the internal combustion engine where energy efficiency of the hybrid vehicle becomes higher when the hybrid vehicle executes the engine direct coupled drive than when the hybrid vehicle executes the series drive.

Advantage of the Invention

According to the hybrid vehicle of the invention that is described in claims 1 to 3 and the control method of the hybrid vehicle of the invention that is described in claim 4, it is possible to determine on the application or release of the power transmission engaging/disengaging portion in consideration of the total energy efficiency.

MODE FOR CARRYING OUT THE INVENTION

Hereinafter, an embodiment of the invention will be described by reference to the drawings.

An HEV (Hybrid Electric Vehicle) has a motor and an internal combustion engine, and is driven by a driving force of the motor and/or the internal combustion engine depending upon the driving condition of the HEV. The HEV is roughly classified into two types: a series HEV and a parallel HEV. The series HEV is driven by a driving force of the motor. The internal combustion engine is used only for generating electric power. Electric power generated by a generator using a driving force of the internal combustion engine is stored in a battery or is supplied to the motor.

The series HEV has two drive modes: an "EV drive mode" and a "series drive mode." In the EV drive mode, the HEV is driven by the driving force of the motor which is driven based on a power supply from the battery. As this occurs, the internal combustion engine is not driven. Additionally, in the series drive mode, the HEV is driven by the driving force of the motor which is driven based on the supply of electric power from both the battery and the motor or the supply of electric power only from the motor. As this occurs, the internal combustion engine is driven only for generation of electric power in the generator.

The parallel HEV is driven by the driving force of either or both of the motor and the internal combustion engine. In particular, the mode in which the parallel HEV is driven only by the internal combustion engine is referred to as an "engine drive mode." Additionally, the mode in which the parallel HEV is driven by the driving force from both the internal combustion engine and the motor is referred to as a "parallel drive mode."

A series/parallel HEV in which both the HEV systems are combined is also known. In this series and parallel combined HEV, a clutch is applied or released (engaged or disengaged) according to the driving condition of the HEV, whereby the transmission system of driving force is switched to either of the series system and the parallel system.

Figure 1:
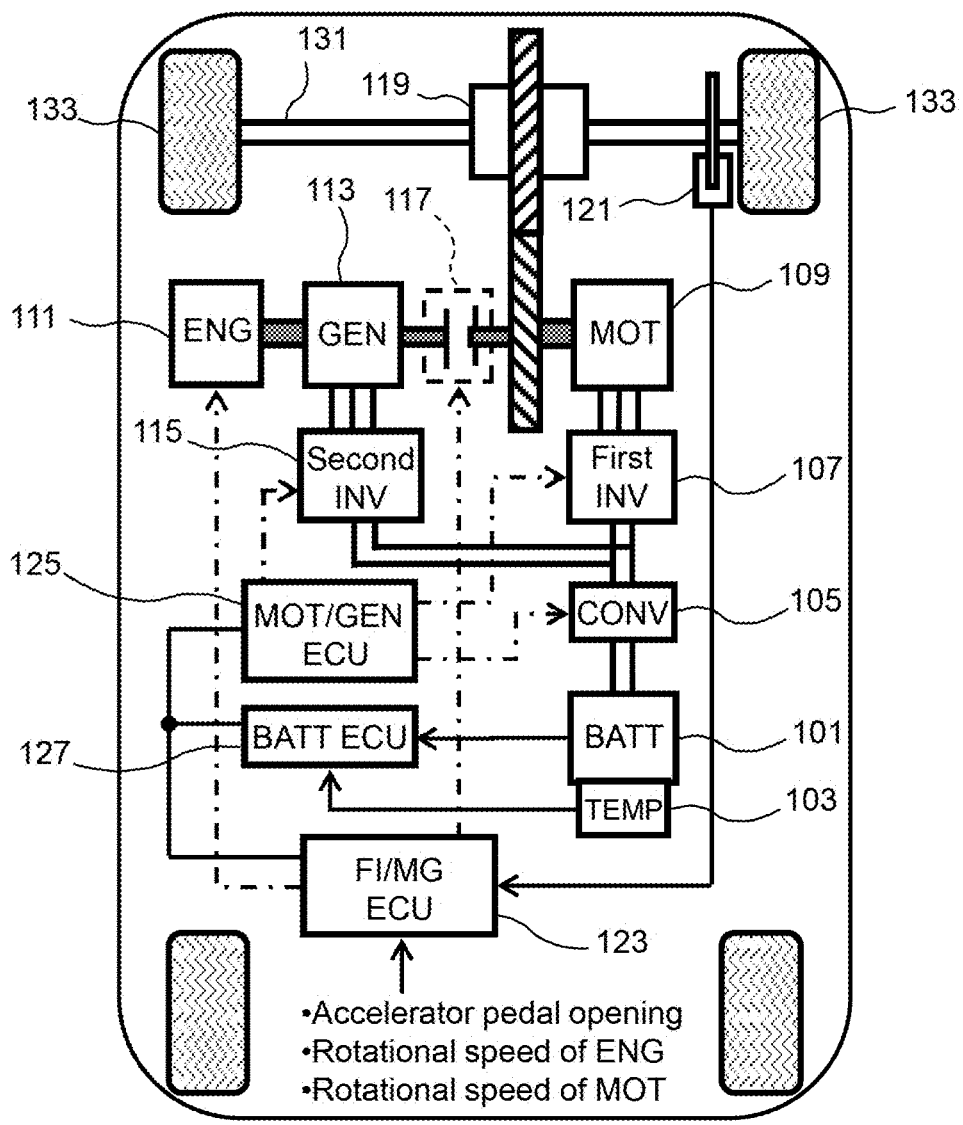
FIG. 1 is a block diagram showing an internal configuration of a series/parallel hybrid electric vehicle (HEV).

FIG. 1 is a block diagram showing an internal configuration of a series/parallel HEV. The series/parallel HEV (hereinafter, referred to as a "hybrid vehicle") shown in FIG. 1 has a battery (BATT) 101, a temperature sensor (TEMP) 103, a converter (CONV) 105, a first inverter (first INV) 107, a motor (MOT) 109, an internal combustion engine (ENG) 111, a generator (GEN) 113, a second inverter (second INV) 115, a clutch 117, a gearbox (hereinafter, referred to simply as a "gear") 119, a vehicle speed sensor 121, a management ECU (FI/MG ECU) 123, a motor ECU (MOT/GEN ECU) 125, and a battery ECU (BATT ECU) 127. Further, the hybrid vehicle includes a sensor (not shown) such as a resolver for detecting a rotational speed of the motor 109 and a sensor (not shown) such as a resolver for detecting a rotational speed of the generator 113.

The battery 101 has a plurality of battery cells which are connected in series and supplies a high voltage of 100 to 200 V, for example. The battery cells are, for example, a lithium ion battery or a nickel-metal hydride battery. The temperature sensor 103 detects a temperature of the battery 101 (hereinafter, referred to as a "battery temperature"). A signal indicating a battery temperature detected by the temperature sensor 103 is sent to the battery ECU 127.

The converter 105 increases or decreases a direct current output voltage of the battery 101 without altering the nature of the direct current. The first inverter 107 converts a direct current voltage to an alternating current voltage to supply a three-phase current to the motor 109. Additionally, the first inverter 107 converts an alternating current voltage which is inputted thereinto when the motor 109 performs a regenerative operation to a direct current to charge the battery 101.

The motor 109 generates power for driving the hybrid vehicle. Torque generated in the motor 109 is transmitted to a drive shaft 131 via the gear 119. A rotor of the motor 109 is directly coupled to the gear 119. In addition, the motor 109 operates as a generator when regenerative braking is executed, and electric power generated in the motor 109 charges the battery 101.

When the hybrid vehicle executes the series drive with the clutch 117 disengaged, the internal combustion engine 111 is used only for the generator 113. When the clutch 117 is applied, however, the output of the internal combustion engine 111 is transmitted to the drive shaft 131 via the generator 113, the clutch 117 and the gear 119 as mechanical energy for driving the hybrid vehicle. The internal combustion engine 111 is coupled directly to a rotor of the generator 113.

The generator 113 generates electric power by using power of the internal combustion engine 111. Electric power generated by the generator 113 is stored in the battery 101 or is supplied to the motor 109. The second inverter 115 converts an alternating current voltage generated in the generator 113 to a direct current voltage. Electric power converted by the second inverter 115 is stored in the battery 101 or is supplied to the motor 109 via the first inverter 107.

The clutch 117 engages or disengages a transmission path of driving force from the internal combustion engine 111 to the drive wheels 133 based on an instruction from the management ECU 123. The gear 119 is, for example, a single-speed fixed gear which corresponds to a fifth gear. Consequently, the gear 119 converts a driving force from the internal combustion engine 111 via the generator 113 or a driving force from the motor 109 to a rotational speed and torque at a specific gear ratio and transmits it to the drive shaft 131. The vehicle speed sensor 121 detects a driving speed (a vehicle speed) of the hybrid vehicle. A signal indicating the vehicle speed detected by the vehicle speed sensor 121 is sent to the management ECU 123.

The management ECU 123 calculates a required driving force based on an accelerator pedal opening (AP opening) which corresponds to an accelerator pedal operation by a driver of the hybrid vehicle and a vehicle speed, switches transmission systems of driving force, controls the engagement/disengagement of the clutch 117, controls the operation of the internal combustion engine 111 and controls the charge/discharge of the battery 101. The controls performed by the management ECU 123 are indicated by alternate long and short dash lines in FIG. 1. The details of the management ECU 123 will be described later.

The motor ECU 125 controls the switching of switching elements which make up individually the converter 105, the first inverter 107, and the second inverter 115 to thereby control the operation of the motor 109 or the generator 113. The controls of the converter 105, the first inverter 107 and the second inverter 115 by the motor ECU 125 are indicated by alternate long and short dash lines in FIG. 1.

The battery ECU 127 derives a remaining capacity (SOC: State Of Charge) of the battery 101 based on information on the battery temperature obtained from the temperature sensor 103, as well as information on a chargeable or dischargeable current and a terminal voltage of the battery 101 and the like.

Figure 2:
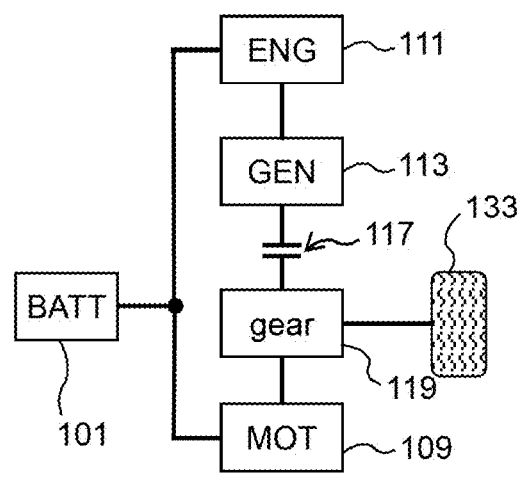
FIG. 2 is a schematic diagram of a main part of a driving system of the hybrid vehicle shown in FIG. 1.
Figure 3:
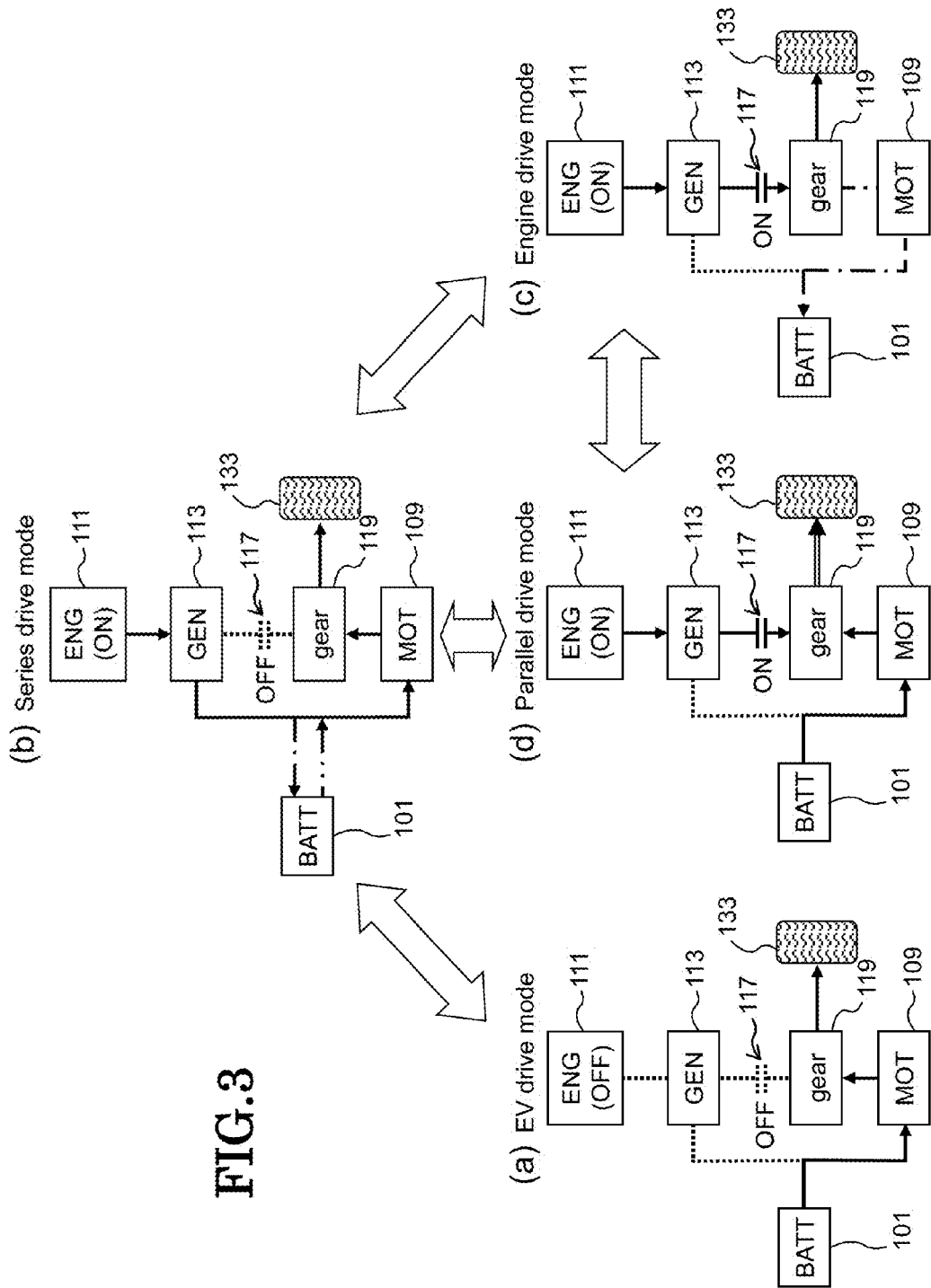
FIG. 3 shows driving states of various drive modes of the hybrid vehicle, in which an EV drive mode is shown at (a), a series drive mode is shown at (b), an engine drive mode is shown at (c), and a parallel drive mode is shown at (d).

FIG. 2 is a schematic diagram of a main part of the driving system of the hybrid vehicle shown in FIG. 1. FIG. 3 shows driving states of various drive modes and transitions between the drive modes of the hybrid vehicle, in which an EV drive mode is shown at (a), a series drive mode is shown at (b), an engine drive mode is shown at (c), and a parallel drive mode is shown at (d).

In the hybrid vehicle which is driven in the EV drive mode, as shown at (a) in FIG. 3, the clutch 117 is released, and the internal combustion engine 111 is stopped. The hybrid vehicle is driven by the driving force of the motor 109 which is driven by a power supply from the battery 101.

In the hybrid vehicle which is driven in the series drive mode, as shown at (b) in FIG. 3, the clutch 117 is released, and the internal combustion engine 111 is operated to supply electric power which is good enough to allow the motor 109 to output a required driving force based on the AP opening and the vehicle speed. The hybrid vehicle is driven by the driving force of the motor 109 which is driven by electric power supplied from the generator 113. It is noted that in the hybrid vehicle which is driven in the series drive mode, the internal combustion engine 111 may be driven at an operation point on the BSFC bottom line to thereby store a residual portion of electric power generated in the battery 101 as indicated by an alternate long and short dash line at (b) in FIG. 3. In addition, in the event that the electric power obtained by driving the internal combustion engine 111 at the operation point on the BSFC bottom line is not good enough to meet the required driving force, in addition to the electric power supplied from the generator 113, assisting electric power may be supplied from the battery 101 to the motor 109 as indicated by a chain double-dashed line at (b) in FIG. 3.

In the hybrid vehicle which is driven in the engine drive mode, as shown at (c) in FIG. 3, the clutch 117 is applied, and the hybrid vehicle is driven by the driving force of the internal combustion engine 111. While the hybrid vehicle is driven in the engine drive mode, the rotor of the motor 109 and the rotor of the generator 113 are entrained to rotate in association with the driving of the internal combustion engine 111. However, the motor ECU 125 performs a zero current control so that an unloaded condition is present in the generator 113. It is noted that in the hybrid vehicle which is driven in the engine drive mode, the internal combustion engine 111 may be operated at an operation point on the BSFC bottom line so that electric power generated in the motor 109 driven as a generator is stored in the battery 101 as indicated by an alternate long and short dash line at (c) in FIG. 3.

In the hybrid vehicle which is driven in the parallel drive mode, as shown at (d) in FIG. 3, the clutch 117 is applied, and the hybrid vehicle is driven by the driving force of both the internal combustion engine 111 and the motor 109. While the hybrid vehicle is driven in the parallel drive mode, the rotor of the generator 113 is entrained to rotate in association with the driving of the internal combustion engine 111. However, the second inverter 115 performs a zero current control so that an unloaded condition is present in the generator 113.

When the hybrid vehicle is accelerated at low to medium speeds, the drive mode of the hybrid vehicle is set to the EV drive mode or the series drive mode with the clutch 117 released. In addition, when the hybrid vehicle is driven constant at medium to high speeds (cruise drive), the drive mode of the hybrid vehicle is set to the engine drive mode with the clutch 117 applied. Then, when the hybrid vehicle is accelerated at medium to high speeds, the drive mode of the hybrid vehicle is set to the parallel drive mode. The setting of the drive mode is executed by the management ECU 123 shown in FIG. 1 after the ECU makes a determination on a driving phase based on the accelerator pedal opening (AP opening) and the vehicle speed. For example, when the driving phase changes from the "low to medium speed acceleration drive" to the "medium to high speed acceleration drive," the management ECU 123 applies the clutch 117 so as to switch the drive mode from the "series drive mode" to the "engine drive mode."

Figure 4:
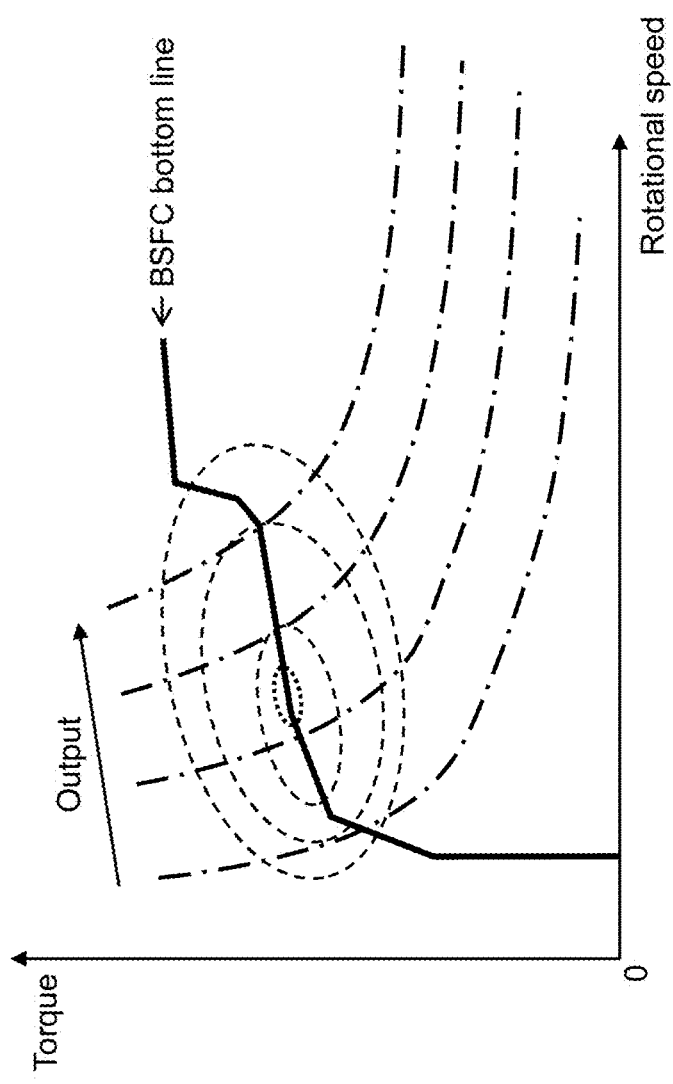
FIG. 4 is a graph showing a characteristic in relation to a thermal efficiency of an internal combustion engine 111.

FIG. 4 is a graph showing a characteristic of the internal combustion engine 111 in relation to thermal efficiency. In the graph, an axis of ordinates represents the torque of the internal combustion engine 111, while an axis of abscissas represents the rotational speed of the internal combustion engine 111. A thick solid line in FIG. 4 is a line which connects operation points of the internal combustion engine 111 where a least fuel consumption rate is obtained (the BSFC bottom line). Alternate long and short dash lines in FIG. 4 are lines which connect operation points of the internal combustion engine 111 where the same output is obtained although the torque and rotational speed differ (equioutput lines). Ovals defined by broken lines in FIG. 4 are lines which connect operation points of the internal combustion engine 111 where the output efficiency of the internal combustion engine 111 become identical (equiefficiency lines). Inner equiefficiency lines represent higher output efficiencies. It is noted that an operation point on the BSFC bottom line which resides within an area surrounded by an innermost equiefficiency line in FIG. 4 is referred to as a "most efficient operation point." An output of the internal combustion engine 111 operated at the most efficient operation point is referred to as a "most efficient output."

Figure 5:
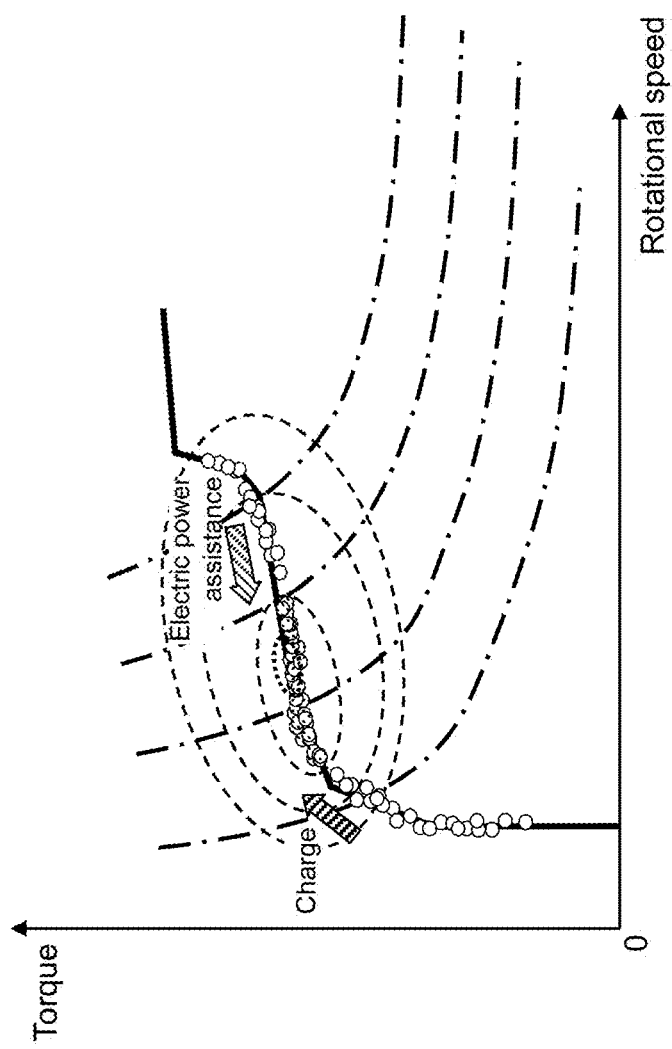
FIG. 5 is a graph showing operation points of the internal combustion engine 111 in the series drive mode.
Figure 6:
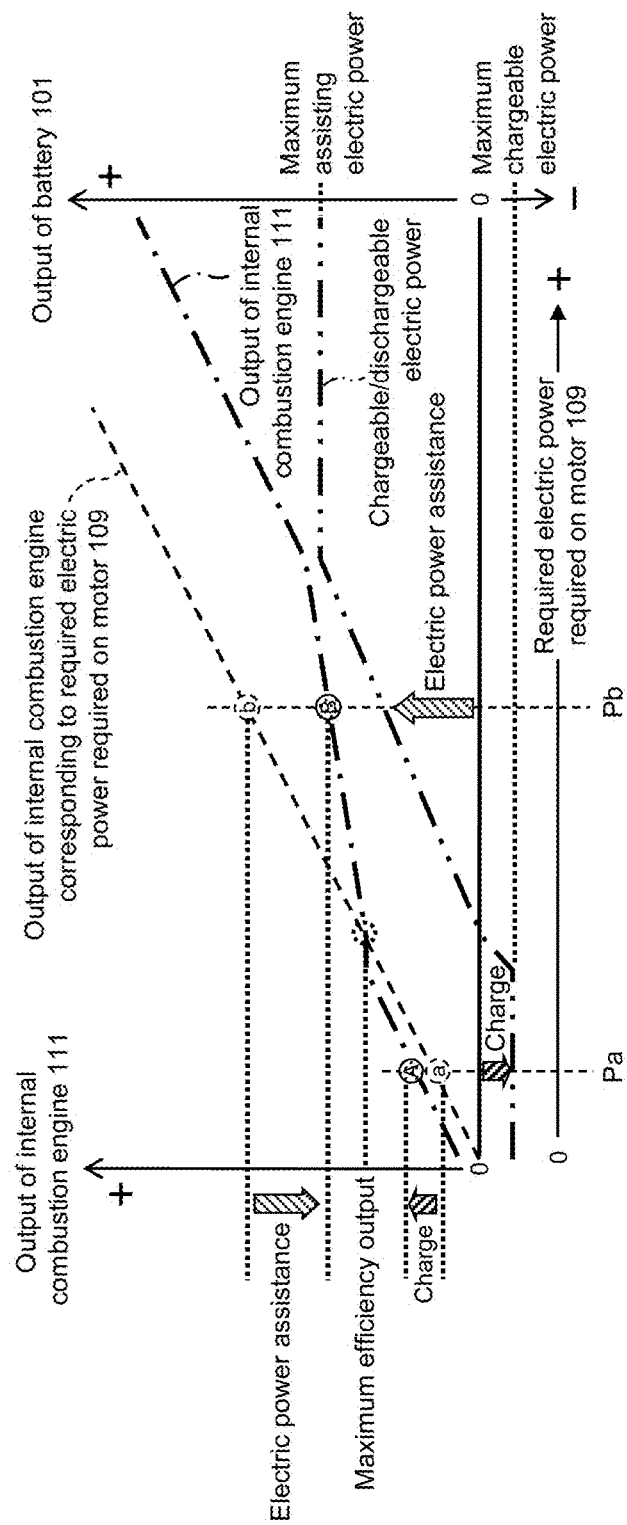
FIG. 6 is a graph showing a change in output of the internal combustion engine 111 and a change in output of a battery 101 in relation to electric power required on a motor 109 in the series drive mode.

Hereinafter, the operation of the internal combustion engine 111 when the hybrid vehicle is driven in the series drive mode with the clutch 117 released will be described by reference to FIGS. 5 and 6. FIG. 5 is a graph showing operation points of the internal combustion engine 111 when the hybrid vehicle is driven in the series drive mode. FIG. 6 is a graph showing a change in the output of the internal combustion engine 111 and the output of the battery 101 in relation to required electric power on the motor 109 when the hybrid vehicle is driven in the series drive mode. The required electric power on the motor 109 means electric power which is good enough for the motor 109 to output a required driving force based on the AP opening and the vehicle speed. The management ECU 123 calculates required electric power required on the motor 109 from a value resulting from adding estimated values of mechanical loss and electrical loss to the required driving force.

When the hybrid vehicle is driven in the series drive mode, the management ECU 123 releases the clutch 117 and controls the operation of the internal combustion engine 111 so as to supply the required electric power to the motor 109. However, because the required electric power required on the motor 109 changes according to the required driving force, in the event that the internal combustion engine 111 is operated so that the generator 113 outputs the required electric power, the internal combustion engine 111 cannot always be operated at the most efficient operation point. However, in view of energy efficiency, it is preferable to operate the internal combustion engine 111 at the most efficient operation point.

In this embodiment, when the hybrid vehicle is driven in the series drive mode, the management ECU 123 controls the internal combustion engine 111 so as to be operated at an operation point close to the most efficient operation point. However, when electric power generated by the generator 113 by using the power of the internal combustion engine 111 is larger than the required electric power required on the motor 109, the management ECU 123 controls so that a residual portion of the electric power generated is stored in the battery 101. On the other hand, when electric power generated by the generator 113 by using the power of the internal combustion engine 111 is smaller than the required electric power required on the motor 109, the management ECU 123 controls so that the battery 101 supplies assisting electric power to the motor 109, in addition to the electric power supplied thereto from the generator 113. Consequently, although the required electric power of the motor 109 changes, the management ECU 123 controls the internal combustion engine 111 so as to be operated at operation points indicated by hatched circles in FIG. 5.

In FIG. 6, an output of the internal combustion engine 111 when it is controlled according to this embodiment in relation to the required electric power required on the motor 109 is indicated by an alternate long and short dash line. In addition, electric power outputted from the battery 101 to complement the electric power generated by the generator 113 or electric power stored in the battery 101 is indicated by a chain double-dashed line. Additionally, an output of the internal combustion engine 111 when it is operated so as to allow the generator 113 to generate the required electric power with neither charging nor assisting in electric power carried out is indicated by a broken line.

As shown in FIG. 6, when required electric power required on the generator 113 is "Pa," the management ECU 123 controls the internal combustion engine 111 so as to be operated at an operation point denoted by "A" in FIG. 6. An output of the internal combustion engine which is operated at the operation point A is higher than an output of the internal combustion engine 111 which is operated at an operation point a so that the generator 113 can generate the required electric power. Consequently, the management ECU 123 controls so that a residual portion of the electric power generated which corresponds to the difference in output is stored in the battery 101.

In addition, when required electric power required on the generator 113 is "Pb," the management ECU 123 controls the internal combustion engine 111 so as to be operated at an operation point denoted by "B" in FIG. 6. An output of the internal combustion engine which is operated at the operation point B is lower than an output of the internal combustion engine which is operated at an operation point b so that the generator 113 can generate the required electric power. Consequently, the management ECU 123 controls the battery 101 so as to supply assisting electric power which compensate for a shortage of electric power from an output of the internal combustion engine which is operated at the operation point b.

The management ECU 123 sets maximum chargeable electric power for residual electric power and maximum assisting electric power based on SOC of the battery 101 derived by the battery ECU 127 and the battery temperature. For example, when the SOC of the battery 101 is higher than a threshold, the management ECU 123 sets the maximum chargeable electric power to a value close to 0 and the maximum assisting electric power to a maximum electric power value that the battery 101 can output. The management ECU 123 controls the operation of the internal combustion engine 111 so that the residual electric power does not exceed the maximum electric power value and the assisting electric power does not exceed the maximum assisting electric power.

Figure 7:
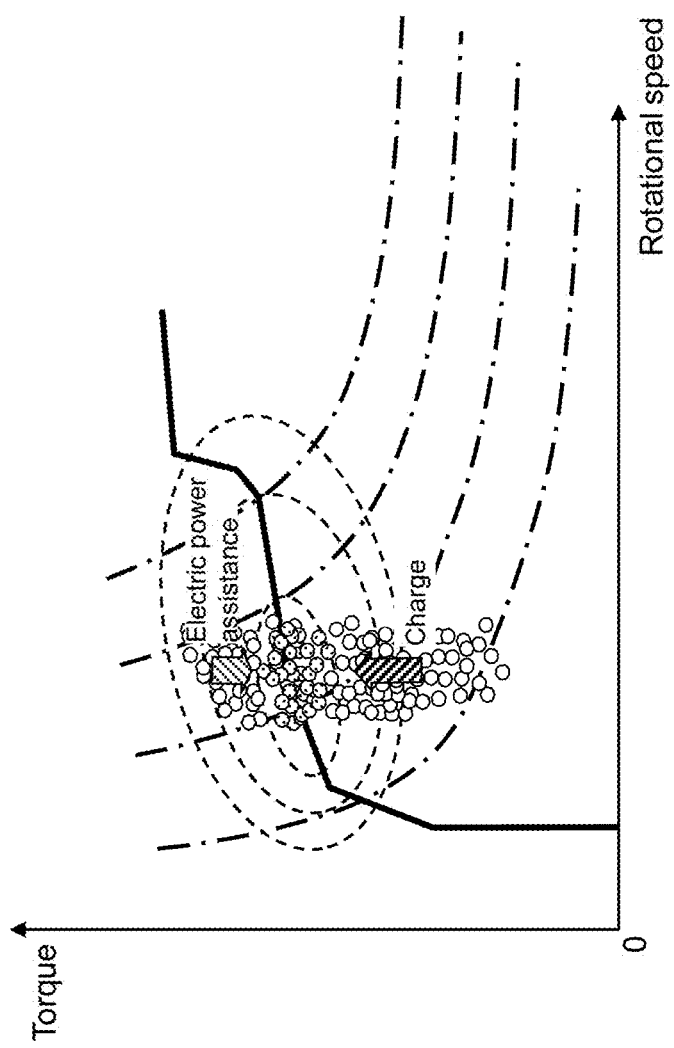
FIG. 7 is a graph showing operation points of the internal combustion engine 111 when the hybrid vehicle executes an engine direct coupled drive.

Next, the operation of the internal combustion engine 111 when the hybrid vehicle is driven in the engine drive mode or the parallel drive mode with the clutch 117 applied will be described by reference to FIG. 7. Hereinafter, the driving of the hybrid vehicle in the engine drive mode or the parallel drive mode will be referred to as an "engine direct coupled drive." FIG. 7 is a graph showing operation points of the internal combustion engine 111 when the hybrid vehicle is driven in the engine direct coupled drive mode.

When the hybrid vehicle is driven in the engine direct coupled mode, the management ECU 123 applies the clutch 117 and controls the operation of the internal combustion engine 111 so as to output a required driving force. However, because the required driving force changes according to the accelerator pedal operation by the driver, the vehicle speed and the like, when the internal combustion engine 111 is operated so as to output the required driving force, the internal combustion engine 111 cannot always be operated at the most efficient operation point. However, in view of energy efficiency, it is preferable to operate the internal combustion engine 111 at the most efficient operation point.

In this embodiment, when the hybrid vehicle is driven in the engine direct coupled drive mode, the management ECU 123 controls the internal combustion engine 111 so that the internal combustion engine 111 is driven at an operation point which lies close to the most efficient operation point. In the event that the output of the internal combustion engine 111 is larger than the required driving force, however, the management ECU 123 performs a control in which the motor 109 is driven as a generator by a residual output so as to store electric power generated in the motor 109 in the battery 101. On the contrary, in the event that the output of the internal combustion engine 111 is smaller than the required driving force, the management ECU 123 performs a control in which the battery 101 supplies assisting electric power to the motor 109. This is the parallel drive mode in which the driving power of the motor 109 complements the output of the internal combustion engine 111. Consequently, although the required driving force changes, the management ECU 123 controls the internal combustion engine 111 so as to be operated at operation points indicated by hatched circles in FIG. 7.

Figure 8:
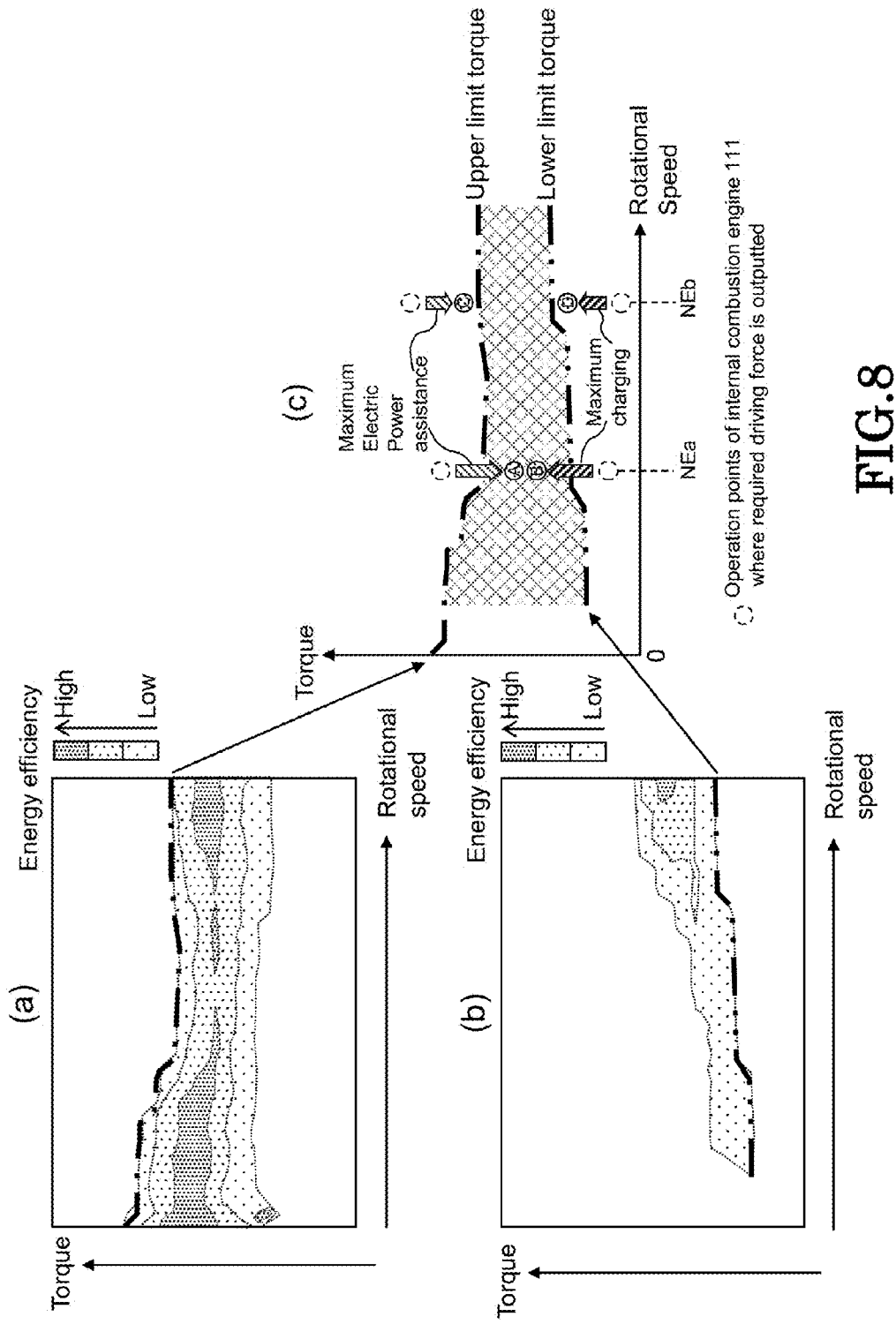
FIG. 8 shows an area where a total energy efficiency of the hybrid vehicle becomes higher when the hybrid vehicle executes the engine direct coupled drive than when the hybrid vehicle executes the series drive mode.

Thus, as has been described heretofore, the total energy efficiency of the hybrid vehicle of this embodiment is derived based on the controls carried out by the management ECU 123. FIG. 8 shows an area where the total energy efficiency of the hybrid vehicle becomes higher when the hybrid vehicle is driven in the engine direct coupled drive mode than when the hybrid vehicle is driven in the series drive mode.

In a graph shown at (a) in FIG. 8, an area is shown as being hatched where the energy efficiency is enhanced more in the engine direct coupled drive mode with the clutch applied than in the series drive mode in such a state that the battery 101 assists in supplying electric power to the motor 109. In the same graph, upper limit torque of the area according to assisting electric power that can be outputted from the battery 101 when the hybrid vehicle is driven in the engine direct coupled drive mode is indicated by an alternate long and short dash line.

In a graph shown at (b) in FIG. 8, an area is shown as being hatched where the energy efficiency is enhanced more in the engine direct coupled drive mode with the clutch applied than in the series drive mode in such a state that the battery 101 is charged. In the same graph, lower limit torque of the area according to electric power that can be stored in the battery 101 when the hybrid vehicle is driven in the engine direct coupled drive mode is indicated by a chain double-dashed line. The upper limit torque indicated by the alternate long and short dash line at (a) and the lower limit torque indicated by the chain double-dashed line at (b) change depending upon the range of electric power that can be stored in or discharged from the battery 101 which differs according to the SOC of the battery 101 and the battery temperature.

When the upper limit torque indicated by the alternate long and short dash line at (a) and the lower limit torque indicated by the chain double-dashed line at (b) are superposed one on the top of the other, an area like a hatched area shown at (c) in FIG. 8 is obtained where the total energy efficiency is enhanced in the engine direct coupled drive mode with the clutch applied than in the series drive mode (hereinafter, referred to as an "engine direct coupled efficiency enhancing area").

Figure 9:
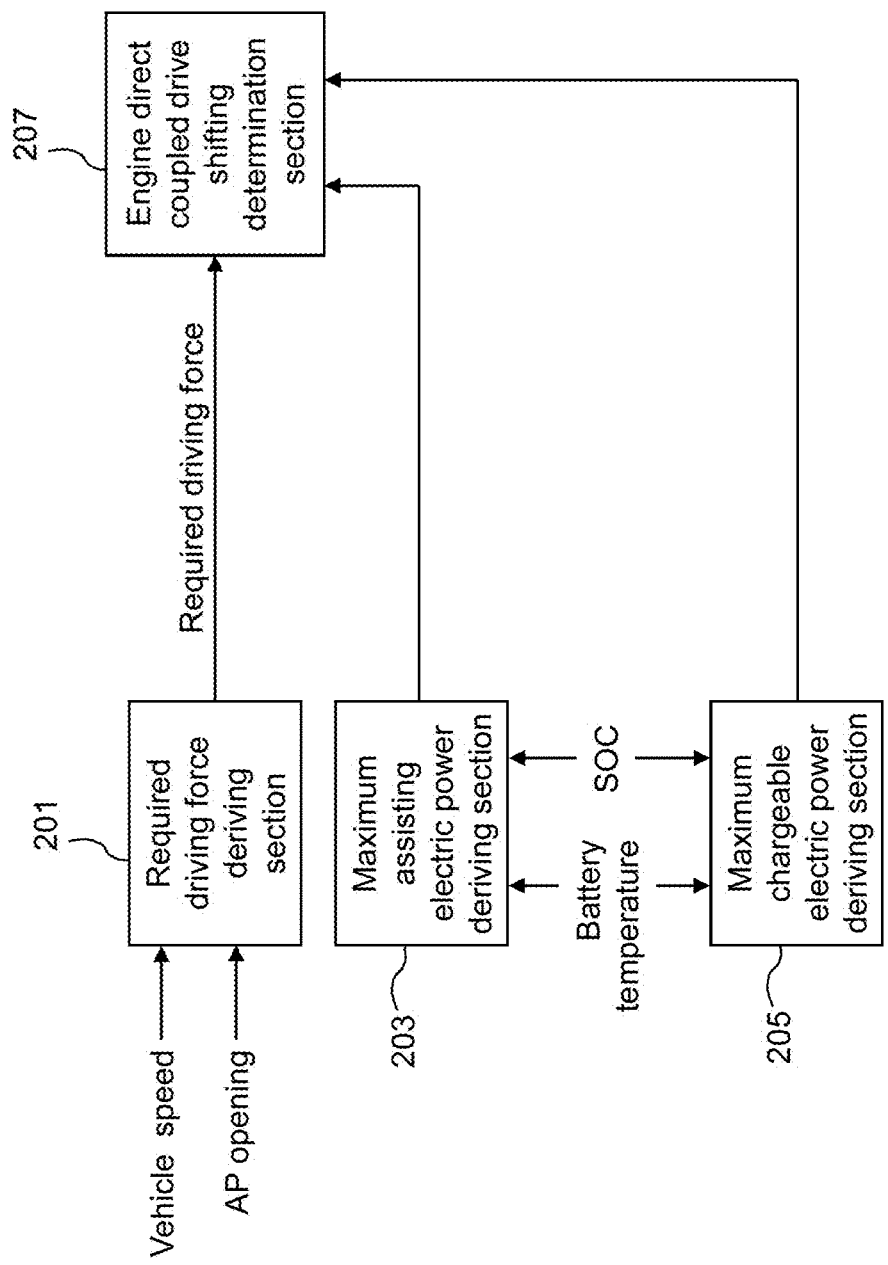
FIG. 9 is a block diagram showing an internal configuration of a management ECU 123.

FIG. 9 is a block diagram showing an internal configuration of the management ECU 123. As shown in FIG. 9, the management ECU 123 has a required driving force deriving section 201, a maximum assisting electric power deriving section 203, a maximum chargeable electric power deriving section 205 and an engine direct coupled drive shifting determination section 207.

The required driving force deriving section 201 derives a required driving force required on the hybrid vehicle based on the AP opening and the vehicle speed. The maximum assisting electric power deriving section 203 derives maximum assisting electric power which is a largest output that the battery can output based on the SOC of the battery 101 derived by the battery ECU 127 and the battery temperature. The maximum chargeable electric power deriving section 205 derives maximum chargeable electric power of the battery 101 based on the SOC of the battery 101 derived by the battery ECU 127 and the battery temperature.

The engine direct coupled drive shifting determination section 207 permits a shift to the engine direct coupled drive mode in the event that an imaginary operation point (an operation point A shown at (c) in FIG. 8) of the internal combustion engine 111 in the case that the maximum assisting electric power derived by the maximum assisting electric power deriving section 203 is supplied to the motor 109 and an imaginary operation point (an operation point B shown at (c) in FIG. 8) of the internal combustion engine 111 in the case that the battery 101 is charged with the maximum chargeable electric power derived by the maximum chargeable electric power deriving section 205, at a rotational speed NEa of the internal combustion engine 111 which corresponds to the required driving force when the hybrid vehicle executes the engine direct coupled drive, are both positioned inside the engine direct coupled efficiency enhancing area. In this way, when the engine direct coupled drive shifting determination section 207 permits the shift from the series drive mode to the engine direct coupled drive mode, the management ECU 123 makes a request for application of the clutch 117.

On the other hand, the engine direct coupled drive shifting determination section 207 cancels the engine direct coupled drive in the event that an imaginary operation point (an operation point C shown at (c) in FIG. 8) of the internal combustion engine 111 in the case that the maximum assisting electric power derived by the maximum assisting electric power deriving section 203 is supplied to the motor 109 or an imaginary operation point (an operation point D shown at (c) in FIG. 8) of the internal combustion engine 111 in the case that the battery 101 is charged with the maximum chargeable electric power derived by the maximum chargeable electric power deriving section 205, when the internal combustion engine 111 is operated at a rotational speed NEb in the hybrid vehicle which is being driven in the engine direct coupled drive mode, is positioned outside the engine direct coupled efficiency enhancing area. In this way, when the engine direct coupled drive shifting determination section 207 determines to cancel the engine direct coupled drive, the management ECU 123 makes a request for release of the clutch 117.

In addition, the engine direct coupled drive shifting determination section 207 prohibits a shift to the engine direct coupled drive based on the range of chargeable or dischargeable electric power of the battery 101 and electric power required to allow the hybrid vehicle to shift to the engine direct coupled drive mode. Electric power required to allow the hybrid vehicle which is driven in the series drive mode to shift to the engine direct coupled drive mode (hereinafter, referred to as "engine direct coupled drive shifting electric power") is a total sum of a target output of the internal combustion engine 111 when the hybrid vehicle is driven in the engine direct coupled drive mode, electric power to adjust the torque of the generator 113 so that the rotational speed of the internal combustion engine 111 is matched to the target rotational speed when the drive mode of the hybrid vehicle is shifted to the engine direct coupled drive and electric power supplied to the motor 109.

When the drive mode of the hybrid vehicle is shifted to the engine direct coupled drive, torque of the generator 113 which is necessary to match the torque of the internal combustion engine 111 to the target torque when the hybrid vehicle is driven in the engine direct coupled drive mode is increased with the rotational speed of the internal combustion engine 111 matched to the target rotational speed. However, as this occurs, in the event that the engine direct coupled drive shifting electric power is outside the range of chargeable or dischargeable electric power of the battery 101, it is considered that the torque of the generator 113 is limited. In the event that the torque of the generator 113 is limited when the drive mode of the hybrid vehicle shifts to the engine direct coupled drive, the torque of the internal combustion engine 111 surpasses the torque of the generator 113, resulting in a situation in which the rotational speed of the internal combustion engine 111 is increased. Consequently, in this embodiment, when the engine direct coupled drive shifting electric power is outside of the range of the chargeable electric power of the battery 101, the engine direct coupled drive shifting determination section 207 prohibits the shift to the engine direct coupled drive.

Figure 10:
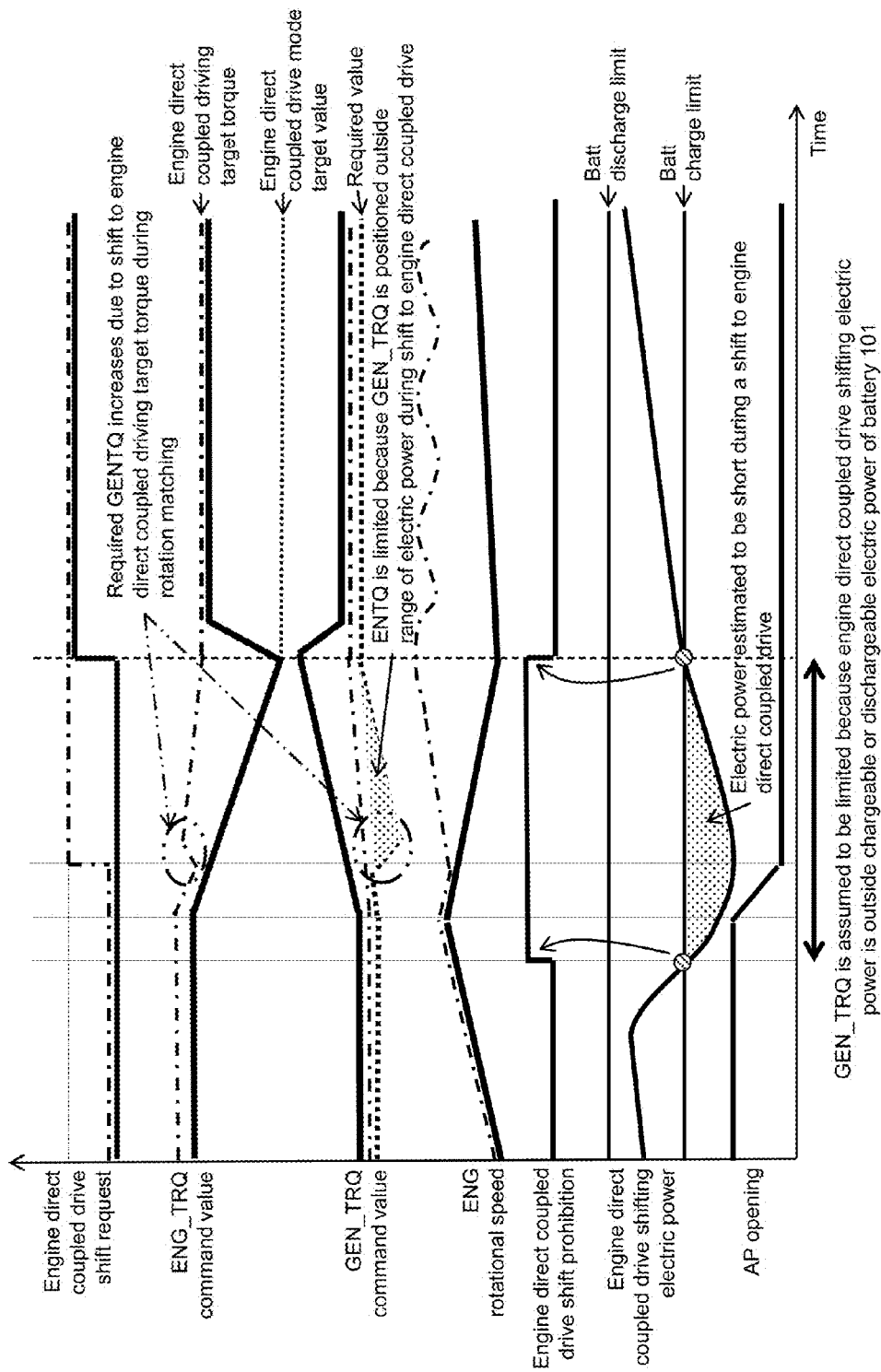
FIG. 10 shows an example of a timing chart when an engine direct coupled drive shifting determination section 207 prohibits a shift to the engine direct coupled drive because engine direct coupled drive shifting electric power is outside a range of chargeable or dischargeable electric power of the battery 101.
Figure 11:
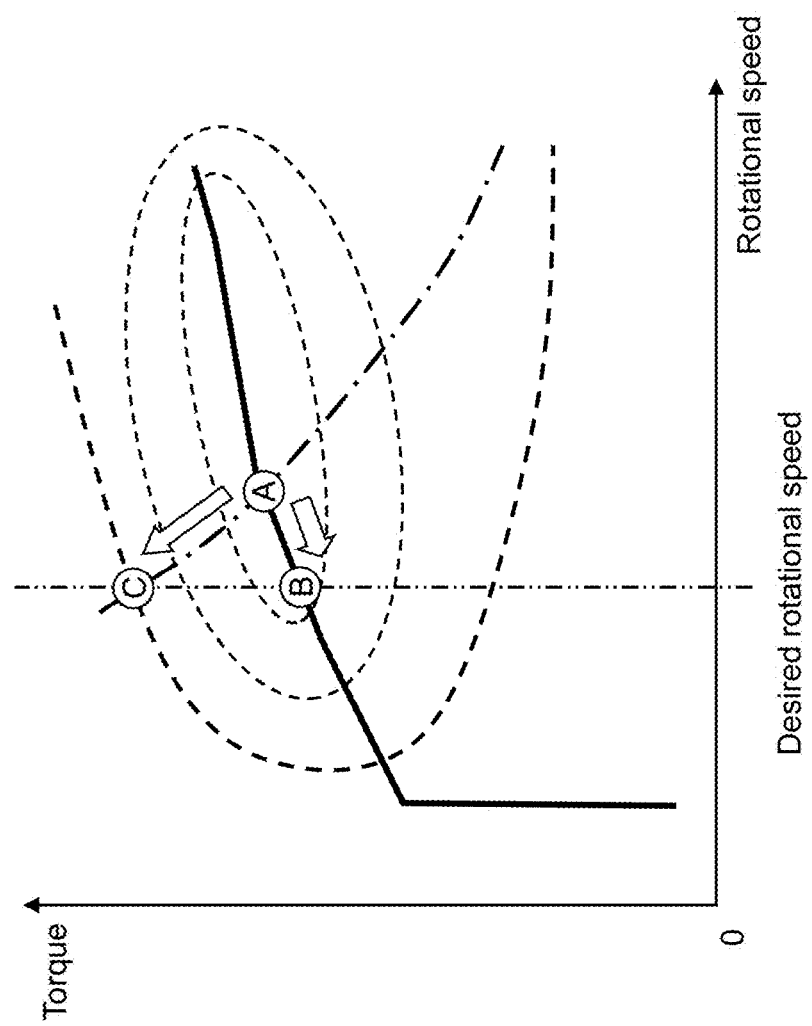
FIG. 11 is a graph showing an example of a characteristic of the internal combustion engine which drives a generator.
Figure 12:
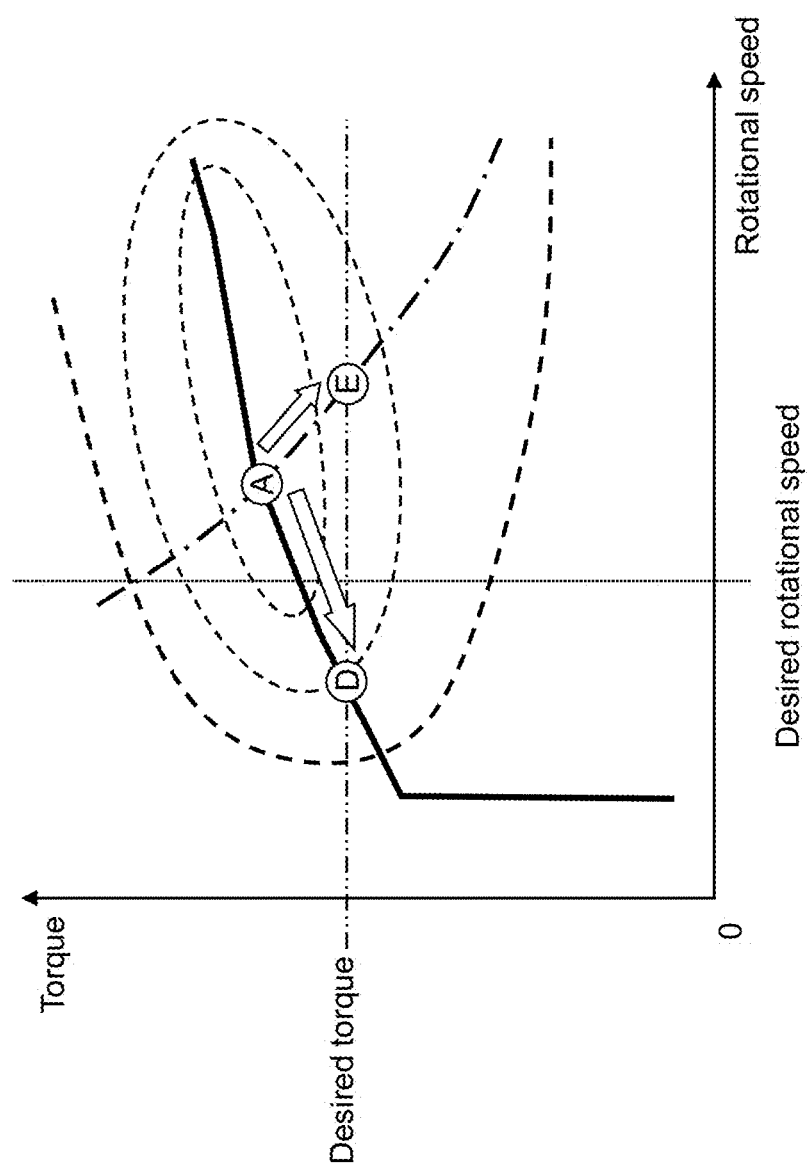
FIG. 12 is a graph showing an example of a characteristic of the internal combustion engine which drives the generator.

FIG. 10 is an example of a timing chart when the engine direct coupled drive shifting determination section 207 prohibits the shift to the engine direct coupled drive because the engine direct coupled drive shifting electric power is outside the range of the chargeable electric power of the battery 101. In the timing chart shown in FIG. 10, changes where a shift to the engine direct coupled drive is executed even though the engine direct coupled drive shifting electric power is outside the range of the chargeable electric power of the battery 101 are indicated by alternate long and short dash lines.

Thus, as has been described heretofore, in this embodiment, when the hybrid vehicle is driven in the series drive mode, the internal combustion engine 111 is operated at the operation points close to the most efficient operation point on the premise of the battery 101 being charged and discharged. Also when the hybrid vehicle is driven in the engine direct coupled drive mode, the internal combustion engine 111 is operated at the operation points close to the most efficient operation point on the premise of the battery 101 being charged and discharged. Because the output efficiency of the internal combustion engine 111 affects largely the total energy efficiency of the hybrid vehicle, when the internal combustion engine 111 is operated at the most efficient operation point, the total energy efficiency of the hybrid vehicle is enhanced. However, because the energy efficiency in the series drive mode and the energy efficiency in the engine direct coupled drive mode differ, it is possible to assume the presence of the "engine direct coupling efficiency enhancing area" where the total energy efficiency is enhanced in the engine direct coupled drive mode than in the series drive mode.

In this embodiment, the determination of whether or not the hybrid vehicle which is driven in the series drive mode is shifted to the engine direct coupled drive mode is made based on whether or not the imaginary operation point of the internal combustion engine 111 where as much assisting electric power as possible is supplied from the battery 101 when the hybrid vehicle is driven in the engine direct coupled mode and the imaginary operation point of the internal combustion engine 111 where the battery 101 is charged as much as possible when the hybrid vehicle is driven in the engine direct coupled drive mode are both positioned inside the "engine direct coupling efficiency enhancing area." In this way, the determination on the shift to the engine direct coupled drive is made based on whether or not the total energy efficiency is enhanced. In addition, when the engine direct coupled drive shifting electric power which is electric power necessary for the hybrid vehicle which is driven in the series drive to shift to the engine direct coupled drive is outside the range of the chargeable or dischargeable electric power of the battery 101, the shift to the engine direct coupled drive is prohibited.

Further, in this embodiment, the cancellation of engine direct coupled drive is determined in the event that either of the imaginary operation point of the internal combustion engine 111 where as much assisting electric power as possible is supplied from the battery 101 when the hybrid vehicle is driven in the engine direct coupled mode and the imaginary operation point of the internal combustion engine 111 where the battery 101 is charged as much as possible when the hybrid vehicle is driven in the engine direct coupled drive mode is positioned outside the "engine direct coupling efficiency enhancing area." In this way, the determination on the cancellation of engine direct coupled drive is also made based on whether or not the total energy efficiency is enhanced.

While the invention has been described in detail and by reference to the specific embodiment, it is obvious to those skilled in the art to which the invention pertains that various alterations and modifications can be made thereto without departing from the spirit and scope of the invention.

DESCRIPTION OF REFERENCE NUMERALS 101 battery (BATT)
103 temperature sensor (TEMP)
105 converter (CONV)
107 first inverter (first INV)
109 motor (MOT)
111 internal combustion engine (ENG)
113 generator (GEN)
115 second inverter (second INV)
117 clutch
119 gearbox
121 vehicle speed sensor
123 management ECU (FI/MG ECU)
125 motor ECU (MOT/GEN ECU)
127 battery ECU (BATT ECU)
131 drive shaft
133 drive wheel
201 required driving force deriving section
203 maximum assisting electric power deriving section
205 maximum chargeable electric power deriving section
207 engine direct coupled drive shifting determination section

The invention claimed is:

1. A hybrid vehicle, comprising:
an internal combustion engine;
a generator which is driven by the internal combustion engine to generate electric power;
a battery which supplies electric power to a motor;
the motor which is connected to drive wheels and which is driven by electric power supplied from at least one of the battery and the generator; and
a power transmission engaging/disengaging portion which is disposed between the generator and the drive wheels so as to engage or disengage a power transmission path from the internal combustion engine to the drive wheels via the generator,
wherein the hybrid vehicle is driven by power from at least one of the motor and the internal combustion engine, and
the hybrid vehicle comprises a control unit for determining whether the hybrid vehicle executes a series drive in which the motor which is driven by electric power generated by the generator based on power of the internal combustion engine is used as a drive source with the power transmission engaging/disengaging portion released, or executes an engine direct coupled drive in which at least the internal combustion engine is used as a drive source with the power transmission engaging/disengaging portion applied,
the control unit comprises:
a required driving force calculating section for calculating a driving force required on the hybrid vehicle based on an accelerator pedal opening which corresponds to an accelerator pedal operation in the hybrid vehicle and a driving speed of the hybrid vehicle;
a maximum assisting electric power deriving section for deriving maximum assisting electric power which is a largest output that the battery enables to output, based on a state of the battery;
a maximum chargeable electric power deriving section for deriving maximum chargeable electric power, which is the electric power derived from a voltage and a current which are supplied to the battery at a maximum when the battery is charged, based on a state of the battery; and
an engine direct coupled drive shifting determination section for permitting a shift from the series drive to the engine direct coupled drive in an event,
when an output of the internal combustion engine driven at an operation point which lies close to a most efficient operation is smaller than the required driving force, and a first imaginary operation point of the internal combustion engine, in a case that the maximum assisting electric power is supplied to the motor, is lower than an upper limit torque of an engine direct coupling efficiency enhancing area at a rotational speed of the internal combustion engine which corresponds to the required driving force, and
when an output of the internal combustion engine driven at an operation point which lies close to the most efficient operation point is larger than the required driving force, and a second imaginary operation point of the internal combustion engine, in a case that the maximum chargeable electric power is charged in the battery, is higher than a lower limit torque of the engine direct coupling efficiency enhancing area at a rotational speed of the internal combustion engine which corresponds to the required driving force,
wherein the engine direct coupling efficiency enhancing area is an area surrounded by the upper limit torque according to assisting electric power that enables to be outputted from the battery when the hybrid vehicle is driven in the engine direct coupled drive mode, and the lower limit torque according to electric power that enables to be stored in the battery when the hybrid vehicle is driven in the engine direct coupled drive mode.

2. The hybrid vehicle according to claim 1, wherein
the engine direct coupled drive shifting determination section determines to cancel the engine direct coupled drive in an event,
when an output of the internal combustion engine driven at an operation point which lies close to the most efficient operation point is smaller than the required driving force, and a third imaginary operation point of the internal combustion engine, in a case that the maximum assisting electric power is supplied to the motor, is higher than the upper limit torque of the engine direct coupling efficiency enhancing area at a rotational speed of the internal combustion engine which corresponds to the required driving force, or when an output of the internal combustion engine driven at an operation point which lies close to the most efficient operation point is larger than the required driving force, and a fourth imaginary operation point of the internal combustion engine, in a case that the maximum chargeable electric power is charged in the battery, is lower than the lower limit torque of the engine direct coupling efficiency enhancing area at a rotational speed of the internal combustion engine which corresponds to the required driving force.

3. The hybrid vehicle according to claim 1, wherein
the engine direct coupled drive shifting determination section prohibits a shift from the series drive to the engine direct coupled drive in an event that electric power required for the hybrid vehicle to shift to the engine direct coupled drive is outside a range of chargeable or dischargeable electric power of the battery.

4. The hybrid vehicle according to claim 1,
wherein when the power transmission engaging/disengaging portion is engaged, an output of the internal combustion engine is converted as mechanical energy at a specific gear ratio based on a single-speed fixed gear to be transmitted to the drive wheels.

5. A control method of a hybrid vehicle comprising:
an internal combustion engine;
a generator which is driven by the internal combustion engine to generate electric power;
a battery which supplies electric power to a motor;
the motor which is connected to drive wheels and which is driven by electric power supplied from at least one of the battery and the generator; and
a power transmission engaging/disengaging portion which is disposed between the generator and the drive wheels so as to engage or disengage a power transmission path from the internal combustion engine to the drive wheels via the generator,
wherein the hybrid vehicle is driven by power from at least one of the motor and the internal combustion engine, and
the hybrid vehicle comprises a control unit for determining whether the hybrid vehicle executes a series drive in which the motor which is driven by electric power generated by the generator based on power of the internal combustion engine is used as a drive source with the power transmission engaging/disengaging portion released, or executes an engine direct coupled drive in which at least the internal combustion engine is used as a drive source with the power transmission engaging/disengaging portion applied, the control unit comprises the steps of:
calculating a driving force required on the hybrid vehicle based on an accelerator pedal opening which corresponds to an accelerator pedal operation in the hybrid vehicle and a driving speed of the hybrid vehicle,
deriving maximum assisting electric power which is a largest output that the battery enables to output, based on a state of the battery,
deriving maximum chargeable electric power of the battery based on a state of the battery, and
permitting a shift from the series drive to the engine direct coupled drive in an event,
when an output of the internal combustion engine driven at an operation point which lies close to a most efficient operation is smaller than the required driving force, and a first imaginary operation point of the internal combustion engine, in a case that the maximum assisting electric power is supplied to the motor, is lower than an upper limit torque of an engine direct coupling efficiency enhancing area at a rotational speed of the internal combustion engine which corresponds to the required driving force, and
when an output of the internal combustion engine driven at an operation point which lies close to the most efficient operation point is larger than the required driving force, and a second imaginary operation point of the internal combustion engine, in a case that the maximum chargeable electric power is charged in the battery, is higher than a lower limit torque of the engine direct coupling efficiency enhancing area at a rotational speed of the internal combustion engine which corresponds to the required driving force,
wherein the engine direct coupling efficiency enhancing area is an area surrounded by the upper limit torque according to assisting electric power that enables to be outputted from the battery when the hybrid vehicle is driven in the engine direct coupled drive mode, and the lower limit torque according to electric power that enables to be stored in the battery when the hybrid vehicle is driven in the engine direct coupled drive mode.

6. The control method according to claim 5,
wherein when the power transmission engaging/disengaging portion is engaged, an output of the internal combustion engine is converted as mechanical energy at a specific gear ratio based on a single-speed fixed gear to be transmitted to the drive wheels.

* * * * *